Jan. 24, 1967     E. K. KOPPELMANN     3,299,749

RECESSING TOOL

Filed Aug. 9, 1965

INVENTOR.
ELDO K. KOPPELMANN
BY
*Barlow & Barlow*
ATTORNEYS

United States Patent Office 3,299,749
Patented Jan. 24, 1967

3,299,749
RECESSING TOOL

Eldo K. Koppelmann, Cumberland, R.I., assignor to Madison Industries, Inc., a corporation of Rhode Island
Filed Aug. 9, 1965, Ser. No. 478,302
4 Claims. (Cl. 77—58)

This invention relates to a recessing tool which is provided with means to undercut or enlarge locally a previously formed hole, preferably at the bottom thereof.

It is often desired to provide a ground finish on a previously formed hole, which hole is particularly characterized as being one with a bottom wall. Grinding wheels that are in use today do not permit grinding of the entire inner surface of the hole all the way to the bottom wall for the simple reason that abrasive grains will not adhere together and maintain themselves in a sharp corner. Thus a grinding wheel which would be used to perform this function has a circumferential surface which is met by two faces with a slight radius. It is only the circumferential surface of the wheel that accomplishes the grinding, and even though this surface might be dressed to a planal face, there will always remain a few thousandths of an inch at the bottom of the hole that will not be ground and will remain as an inner radius. For many purposes where it is desired to fit a part into the previously formed hole, it will be apparent that this part will not bottom because of the unground arc along this radius, and it is therefore desired to provide a tool which will undercut or enlarge the hole locally adjacent the bottom wall thereof and provide a corner relief. Similar experiences are found in tapping a previously formed hole when one desires to tap it all the way to the bottom thereof, and undoubtedly there are additional uses to which the tool of the instant invention may be placed.

It is accordingly a general object of the invention to provide an improved undercutting tool.

A further object of the invention is to provide an undercutting tool in combination with a boring bar arrangement whereby the tool will advance towards the work at an angle to the axis of the boring bar.

Another object of the invention is to provide an advancing means for a cutting tool in a boring bar consisting of compound ways which will advance the tool at an angle to the axis of the boring bar.

With these and other objects in view, the invention consists of certain novel features of construction as will be more fully described and particularly pointed out in the appended claims.

Figure 1:
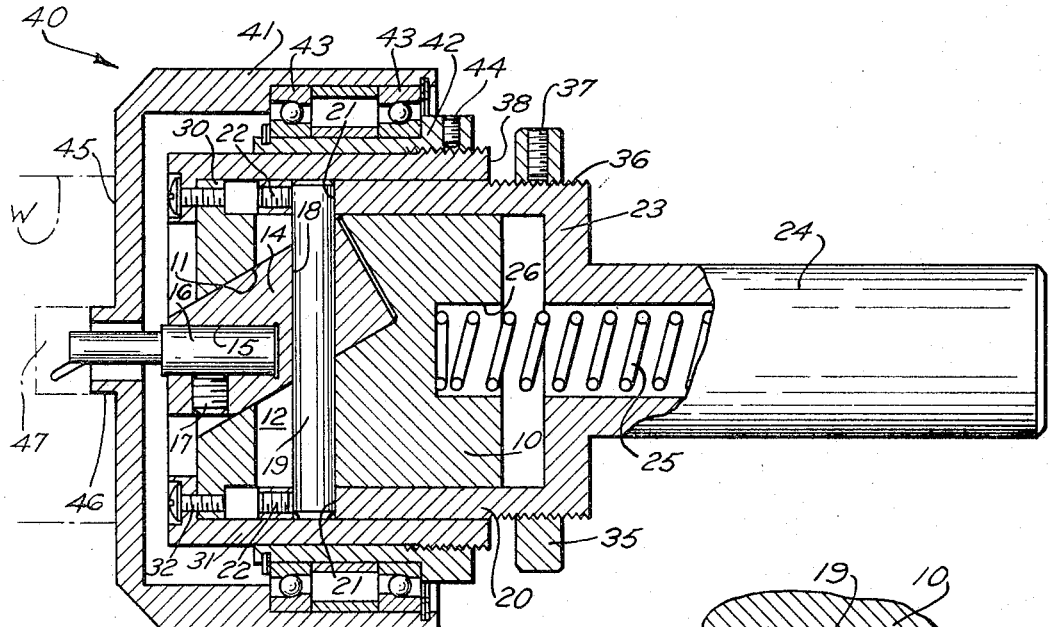
FIG. 1 is a view partly in section of the recessing tool of the invention in which the cutter is retracted.
Figure 3:
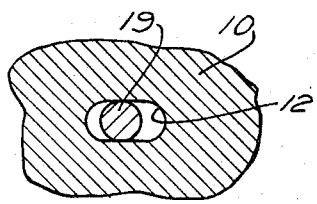
FIG. 3 is a sectional view showing the slot in the body member.
Figure 2:
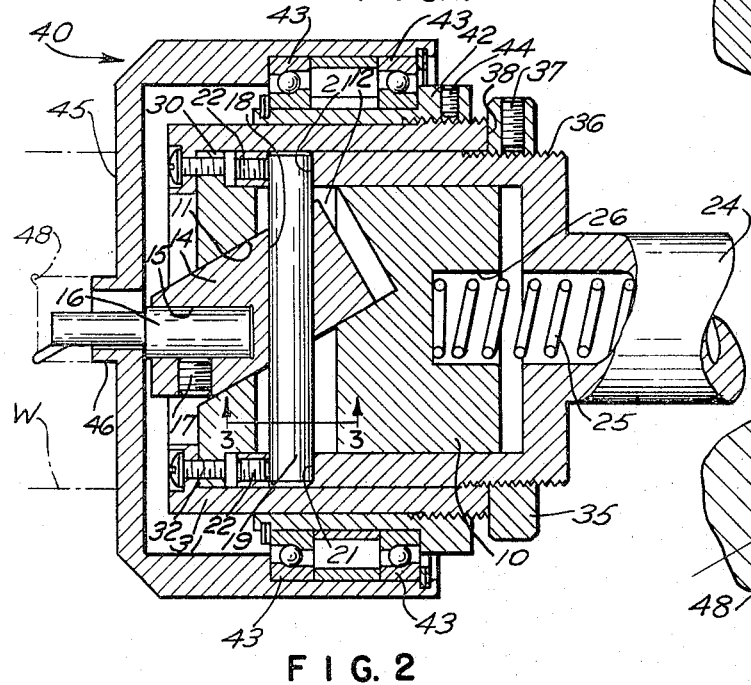
FIG. 2 is a view similar to FIG. 1 with the cutting tool extended a portion of its distance of travel.
Figure 4:
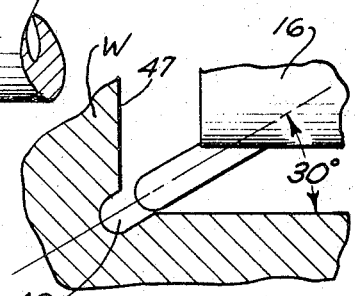
FIG. 4 is a sectional view of a work piece with a recessing tool retracted after making its cut.

Referring to the drawings, 10 designates a cylindrical body which is provided with a bore 11 at an angle to its center axis and which is here shown as 30° to such axis. A slot 12 extends diametrically across the cylindrical body and intersects this angular bore 11. In this angular bore 11 there is freely slidable a block 14 which is provided with a bore 15 having an axis parallel to the axis of the body 10 for mounting a recessing tool 16 therein and which tool is held by a set screw 17. This block is also provided with a bore 18 for the reception of a pin 19 which extends slidably through the bore 18 and also slidably through the slot 12 of the body. This pin is of a length to extend diametrically across the body and project each of its ends beyond the body. A sleeve 20 slidably engages the outer cylindrical surface of the body 10 and is provided with holes 21 therein which receives the ends of the pin 19, which pin is held in this sleeve by set screws 22. The sleeve is provided with an end wall 23 with a shank 24 extending from this end wall, which shank is recessed to receive a spring 25 which engages an abutment in the shank, and this spring is also located in a recess 26 in the body 10 and presses against the bottom of this recess 26 so as to tend to move the sleeve to the right with reference to the body 10 and to retract the block 14 in the body to the position shown in FIG. 1.

The body is provided with a flange at its forward end 30 which provides a limit for the relative movement of the sleeve and the body in one direction and also serves to fixedly mount a guide tube 31 by means of screws 32 which telescopes the sleeve 20 so as to guide the sleeve 20 in its movement relative to the body.

A stop collar 35 has threaded engagement with the threads 36 on the sleeve 20 and may be fixed in any position along this threaded surface by a set screw 37 after it has been adjusted to a position to limit the movement of the sleeve with reference to the body, short of its engagement with flange 30, by its engagement with the end surface 38 of the guide 31.

A pilot 40, having a cylindrical wall 41, is rotationally mounted upon the guide tube 31 by a collar 42 and thrust ball bearings 43 and is provided with an end wall 45 that may have a guide boss or projection 46 thereon so that the end wall may engage a surface of the work W with the boss 46 projecting into an opening 47 in the work. The collar threadingly engages sleeve 38 and is held in adjusted position by a set screw 44.

To use the tool of this invention, it must be recognized that, effectively, adjustment of collar 42 axially locates the cutter relative to the hole to be undercut. Secondly, the stop collar 35 must be adjusted to achieve the desired tool stroke. With these parameters set, the tool assembly is advanced to the left as viewed in the drawing to engage the work and continued advance of shank 24 will move pin 19 and, in turn, block 14 that will slide in bore 11 moving the tool to undercut a recess such as 48. Spring 25 will return the parts to rest position as in FIG. 1, upon release of axial force on shank 24, and the tool assembly may be entirely withdrawn.

I claim:

1. A recessing tool comprising a pilot, an elongated body rotatably mounted with reference to said pilot, said body having a bore formed therein from one end of the body at an angle to the axis of the body and a slot extending diametrically across the body and intersecting said bore, a block slidable in said bore for carrying a tool to engage a work piece, a pin slidably engaging said block and extending through said slot and beyond the body and means engaging the ends of said pin to slide it in said slot toward and from said pilot and urge the block outwardly from the body at an angle to the axis of the body.

2. A recessing tool as in claim 1 wherein said means engaging said pin is a sleeve slidable axially of said body.

3. A recessing tool as in claim 1 wherein said means engaging said pin is a sleeve slidable axially of said body and means fixed to said body to provide a guide for said sleeve.

4. A recessing tool as in claim 3 wherein a pilot is rotatably mounted on said guide means.

References Cited by the Examiner
UNITED STATES PATENTS 2,847,882   8/1958   Benjamin et al.
2,848,912   8/1958   Kalat.

WILLIAM W. DYER, JR., Primary Examiner.
G. A. DOST, Assistant Examiner.